United States Patent
Wang (10) Patent No.: US 9,686,814 B2
(45) Date of Patent: Jun. 20, 2017

(54) METHOD OF REFERENCE CELL MAINTENANCE

(71) Applicant: Industrial Technology Research Institute, Hsinchu (TW)

(72) Inventor: Chun-Yen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 216 days.

(21) Appl. No.: 13/668,322

(22) Filed: Nov. 5, 2012

(65) Prior Publication Data

US 2013/0114398 A1 May 9, 2013

Related U.S. Application Data (60) Provisional application No. 61/556,298, filed on Nov. 7, 2011.

(51) Int. Cl.
| | | |
|---|---|---|
| H04W 24/04 | (2009.01) | |
| H04W 76/04 | (2009.01) | |
| H04L 5/00 | (2006.01) | |

(52) U.S. Cl.
CPC ........... *H04W 76/048* (2013.01); *H04L 5/001* (2013.01)

(58) Field of Classification Search
None
See application file for complete search history.

(56) References Cited

U.S. PATENT DOCUMENTS

| | | | |
|---|---|---|---|
| 2011/0044250 A1 | 2/2011 | Han | |
| 2012/0113889 A1 | 5/2012 | Noh | |
| 2012/0207089 A1* | 8/2012 | Kone | H04L 5/001 370/328 |
| 2012/0257513 A1* | 10/2012 | Yamada | H04L 1/0618 370/248 |
| 2012/0281548 A1* | 11/2012 | Lin | H04W 36/30 370/242 |
| 2013/0028198 A1* | 1/2013 | Yamada | H04W 56/0005 370/329 |
| 2013/0182687 A1* | 7/2013 | Ng | H04W 56/0015 370/336 |

FOREIGN PATENT DOCUMENTS

| | | |
|---|---|---|
| KR | 1020110007986 A | 1/2011 |
| KR | 1020110020668 A | 3/2011 |

(Continued)

OTHER PUBLICATIONS

Sharp, A special SCell for CA enhancement, 3GPP TSG-RAN WG2#75bis, R2-115174, Oct. 10-14, 2011, p. 1-p. 5, XP050540970, Zhuhai, China.

(Continued)

*Primary Examiner* — Kouroush Mohebbi
(74) *Attorney, Agent, or Firm* — Winston Hsu (57) ABSTRACT

A method of reference cell maintenance for a mobile device in a wireless communication system is disclosed. the method comprises being configured a plurality of secondary cells, where one of the plurality of secondary cells is a reference cell for information reference for another secondary cell, and keeping the reference cell in activated when the reference cell is used by another secondary cell for information reference.

16 Claims, 11 Drawing Sheets

(56) References Cited

FOREIGN PATENT DOCUMENTS

WO    2009157168 A1    12/2009
WO    2010087176 A1    8/2010

OTHER PUBLICATIONS

Alcatel-Lucent et al., Timing reference and pathloss reference for SCell group, TSG-RAN WG2#75bis, R2-115337, Oct. 10-14, 2011, p. 1-p. 3, XP050540861, Zhuhai, China.
New Postcom, Timing reference cell selection, 3GPP TSG RAN WG2 Meeting #75bis, R2-114902, Oct. 10-14, 2011, p. 1-p. 4, XP050540639, Zhuhai, China.
Intel Corporation, on open Issues on Multiple Timing Advance in Rel-11 CA, 3GPP TSG RAN2#75 meeting, R2-114249, Aug. 22-26, 2011, p. 1-p. 5, XP050540014, Athens, Greece.
Nokia Siemens Networks et al., Radio Link Monitoring of SCells, 3GPP TSG-RAN WG2 Meeting #72, R2-106183, Nov. 15-19, 2010, XP050605519, Jacksonville, U.S.A.

* cited by examiner

METHOD OF REFERENCE CELL MAINTENANCE

CROSS REFERENCE TO RELATED APPLICATIONS

This application claims the benefit of U.S. Provisional Application No. 61/556,298, filed on Nov. 7, 2011 and entitled "Methods and System for Reference Cell Maintenance" the contents of which are incorporated herein in their entirety.

BACKGROUND OF THE INVENTION

1. Field of the Invention

The application relates to a method utilized in a wireless communication system, and more particularly, to a method of reference cell maintenance in a wireless communication system.

2. Description of the Prior Art

Toward advanced high-speed wireless communication system, such as transmitting data in a higher peak data rate, LTE-Advanced system is standardized by the 3rd Generation Partnership Project (3GPP) as an enhancement of Long-Term Evolution (LTE) system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where a user equipment (UE) can establish multiple links corresponding to the multiple component carriers for simultaneously receiving and transmitting. In carrier aggregation, the UE only has one radio resource control (RRC) connection with the network. At RRC connection establishment/re-establishment/handover, one serving cell provides the Non-Access Stratum (NAS) mobility information, and at RRC connection re-establishment/handover, one serving cell provides the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Since the UE may not need to use all of the configured cells (i.e. PCell and one or more SCells), only some SCells are activated, so as to save UE power. Note that, the PCell is always activated. Generally, the eNB activates or deactivates a SCell by sending a signalling (e.g. a medium access control control element (MAC CE), or Activation/Deactivation command) to the UE. In addition, the UE starts a deactivation timer for a SCell when the SCell is activated, wherein the SCell is deactivated when the deactivation timer expires. In other words, the deactivation timer provides a period of time for SCell activation. Please note that, when the SCell is deactivated, the UE does not need to monitor physical downlink control channel (PDCCH) of the SCell. Further, the UE shall not transmit sounding reference signal (SRS) on the SCell, on uplink shared channel (UL-SCH) of the SCell, and not report channel quality indicator (CQI), precoding matrix indicator (PMI), rank indicator (RI), and precoding type indicator (PTI) for SCell.

As abovementioned, it is possible to configure a UE of a PCell and one SCell or more SCells. Therefore, multiple timing alignments, each for synchronization with a serving base station on uplink timing for preventing signals transmitted from the UE from colliding with those sent from other UEs under the coverage of the base station, are needed for PCell and SCell or more SCells. Note that, serving cells having uplink to which the same timing alignment applies are grouped in a timing alignment (TA) group. Each timing alignment group contains at least one serving cell with configured UL, and the mapping of each serving cell to a timing alignment group is configured by the serving eNB. In order to realize uplink timing alignment, the UE maintain a time alignment timer (TAT) whose running state indicates that uplink transmission is still synchronized. TAT may be applied for a TA group. Functionality of the TAT shall be well-known in the art, so it is not given herein.

Note that, in carrier aggregation, a UE may apply information (i.e. parameter settings) to one cell by referring to the information observed from other cell, which is called reference cell in this disclosure. For example, the reference cell may be a timing reference cell or a pathloss reference cell. For the timing reference cell, if a UE uses the downlink timing of Cell #x as the timing reference for the Cell #y, then call Cell #x is the timing reference cell of the Cell #y. As to the pathloss reference cell, a UE may determine uplink transmission power based on a lot of parameters. One of parameters may be the pathloss estimation. If UE determines uplink transmission power (e.g. PUSCH or PUCCH transmission power) for the Cell #y based on the downlink pathloss estimation from the Cell #x, then the Cell #x is the pathloss reference cell of the Cell #y.

A SCell could be in activation or deactivation state. In addition, a UE may lose its reference cell because reference Cell could be de-configured, de-activated, or suffer poor channel condition (e.g. radio link problem or radio link failure (RLF)). However, reference from a deactivated (or de-configured, or poor channel condition) SCell (i.e. a timing reference cell or a pathloss reference cell) may be less accurate, for example, due to less frequent measurements on the deactivated SCell.

SUMMARY OF THE INVENTION

The application discloses a method of reference cell maintenance in a wireless communication system in order to solve the abovementioned problems.

A method of reference cell maintenance for a mobile device in a wireless communication system is disclosed. The method comprises being configured a plurality of secondary cells, where one of the plurality of secondary cells is a reference cell for information reference for another secondary cell, and keeping the reference cell in activated when the reference cell is used by another secondary cell for information reference.

A method of reference cell maintenance for a mobile device in a wireless communication system is disclosed. The method comprises being configured a plurality of secondary cells, where one of the plurality of secondary cells is a first reference cell for information reference for another secondary cell, and selecting a first secondary cell of the plurality of secondary cell as a new reference cell when the first reference cell is lost.

A method of reference cell maintenance for a mobile device in a wireless communication system is disclosed. The method comprises being configured a plurality of secondary cells, where one of the plurality of secondary cells is a reference cell for information reference for another secondary cell, and stopping transmission on the another secondary cell when the reference cell is lost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
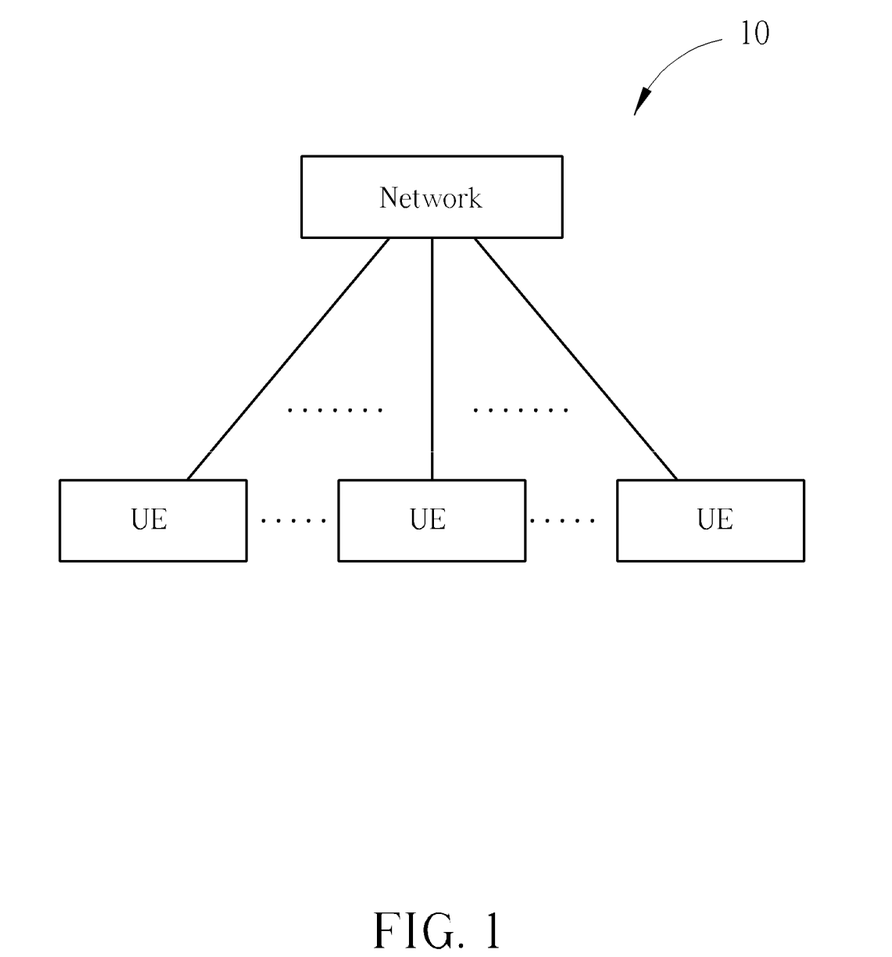
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-Advanced) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, a camera, a television, a hand-held video game device, a musical device, a wireless sensor, etc. In some applications, a UE may be a fixed computing device operating in a mobile environment, such as a bus, a train, an airplane, a boat, a car, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
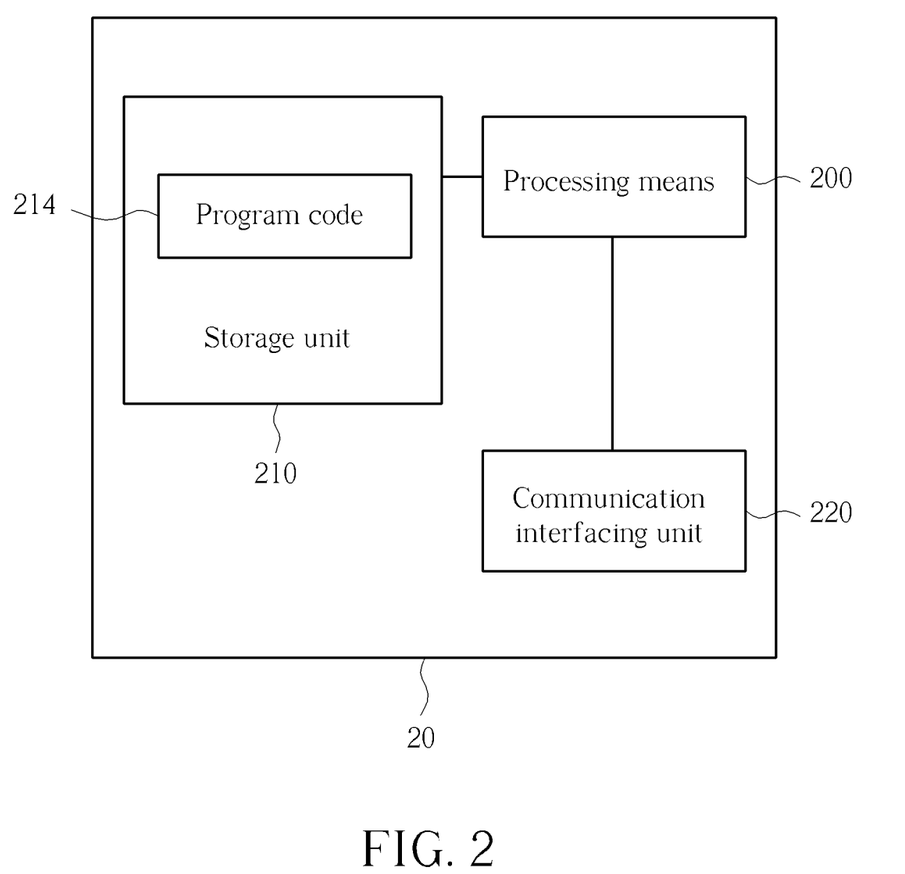
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network (i.e. PCell or SCell1-SCellN) according to processing results of the processing means 200.

Figure 3:
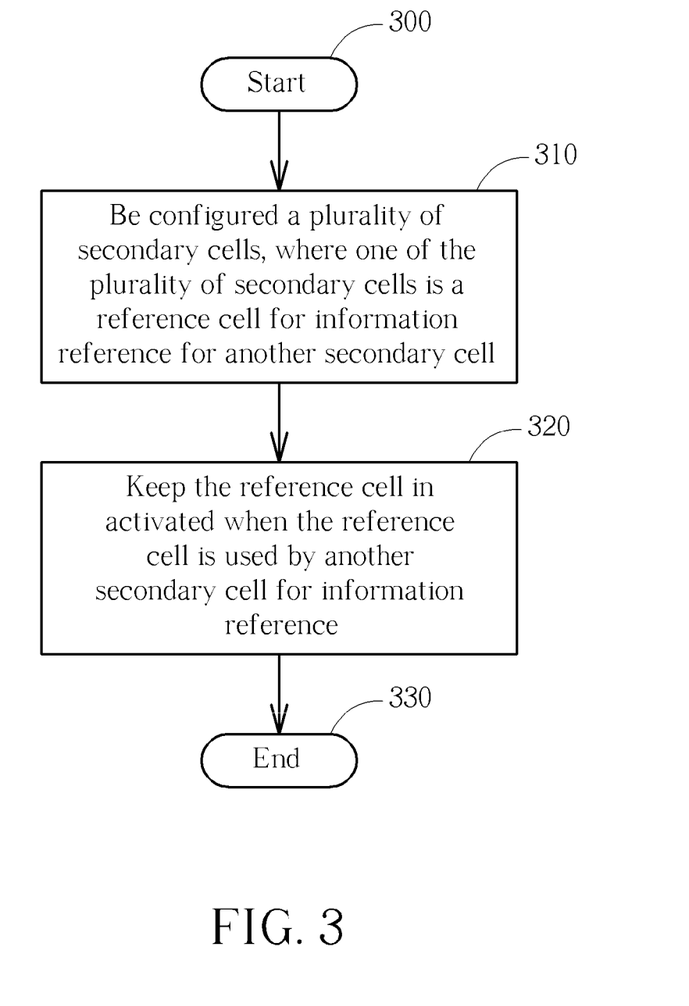
FIG. 3 is a flowchart of an exemplary process.

Please refer to FIG. 3, which illustrates a flowchart of an exemplary process 30. The process 30 is utilized in an UE for reference cell maintenance. The process 30 can be compiled into the program code 214 and includes the following steps:

Step 300: Start.

Step 310: Be configured a plurality of secondary cells, where one of the plurality of secondary cells is a reference cell for information reference for another secondary cell.

Step 320: Keep the reference cell in activated when the reference cell is used by another secondary cell for information reference.

Step 330: End.

According to the process 30, as long as other cell uses the reference cell as information reference (e.g. parameter settings), the reference cell is kept in activated state. Thus, other cell does not refer to a deactivated reference cell, so as to avoid inaccurate information reference.

For reference cell configuration and/or determination, the reference cell may be determined by a network (e.g. an eNB). In an embodiment, the network may send a message (e.g. a radio resource control (RRC) message) to indicate the reference cell for a cell. In addition, the network may indicate the reference cell for a cell implicitly. For example, in case of cross-carrier scheduling, the network may configure a scheduling cell for a cell by using RRC message. Afterward, the scheduling cell may be the reference cell for the scheduled cell. In another embodiment, the network may send a message (e.g. a physical downlink control channel (PDCCH) order, or a RRC message) to indicate the reference cell for a group (e.g. a timing alignment (TA) group). Thus, all cells in the TA group refer to this reference cell. For example, the network may send a message (e.g. a PDCCH order) to the UE to initiate a random access procedure on a cell. This cell may become the reference cell for cells in the TA group after the random access procedure is completed successfully. In addition, the network may indicate the reference cell for a group implicitly. For example, the network may assign a cell identity for a cell. The cell with the smallest cell identity may be the reference cell for cells in the group (e.g. TA group).

On the other hand, the reference cell may be determined by a UE. In this situation, the UE may send a message (e.g. a RRC message) to inform the network about the selected reference cell (for a cell or for a group of cells (e.g. a TA group)). In some embodiments, the reference cell (for a cell or for a group of cells) may be pre-defined (e.g. in the 3GPP technical specification). For example, the pre-defined reference cell may be the PCell or the System Information Block 2 (SIB2) Linked Cell.

After determination/configuration of the reference cell, if the UE receives a command (e.g. Activation/Deactivation command) for activating the reference cell, the UE may activate the reference cell, and/or SRS transmissions on the reference cell, and/or CQI/PMI/RI/PTI reporting for the reference cell, and/or PDCCH monitoring on the reference cell, and/or PDCCH monitoring for the reference cell, and/or Power Headroom Report (PHR) reporting for the reference cell, and/or start Radio Link Monitoring (RLM) on the reference cell, and/or start or restart the deactivation timer associated with the reference cell.

Figure 4:
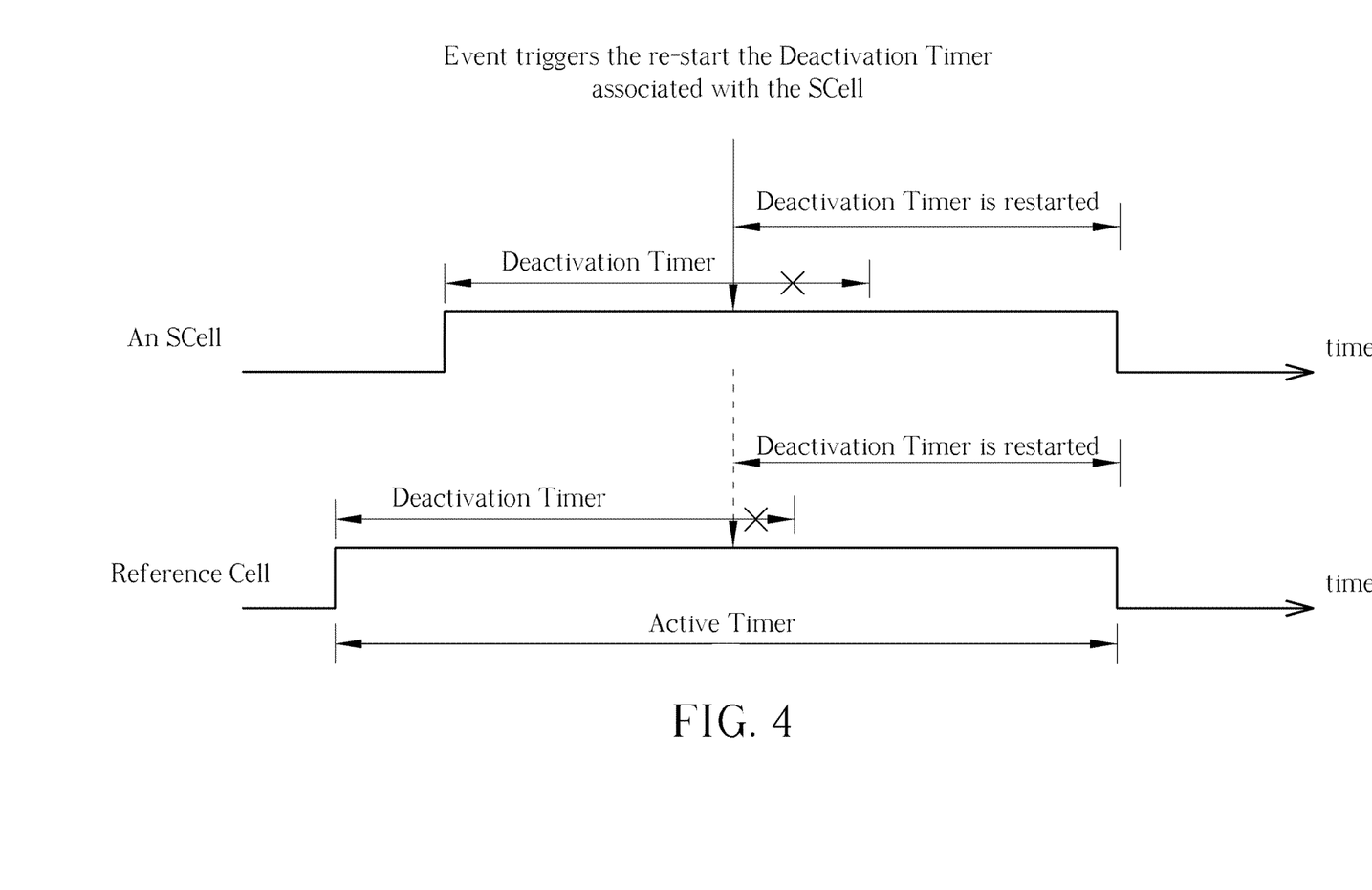
FIGS. 4-9 illustrate schematic diagrams of reference cell maintenance according to several embodiments.

In order to realize the process 30, the UE may extend the activation time of the reference cell. Please refer to FIGS. 4-9, which illustrate schematic diagrams of reference cell maintenance according to several embodiments. In FIG. 4, the UE is configured with a first SCell and is configured with a second SCell as the reference cell for the first SCell. When the first SCell and the reference cell are activated, the UE starts a deactivation timer respectively for the first SCell and reference cell. The functionality of the deactivation timer shall be well-known in the art, so it is not given herein. In this situation, if events trigger the first SCell to start or restart the deactivation timer associated to the first SCell, the UE starts or restarts the deactivation timer associated to the first SCell and starts or restarts the deactivation timer associated with the reference cell. Thus, the activation time for the reference cell is extended. Note that, the events triggering the start or restart the deactivation timer associated with the first SCell may include that the UE receives a Activation/Deactivation command for activating the first SCell, and/or PDCCH on the first SCell indicates an uplink grant or a downlink assignment, and/or PDCCH on a cell scheduling the first SCell indicates an uplink grant or a downlink assignment for the first SCell.

Figure 5:
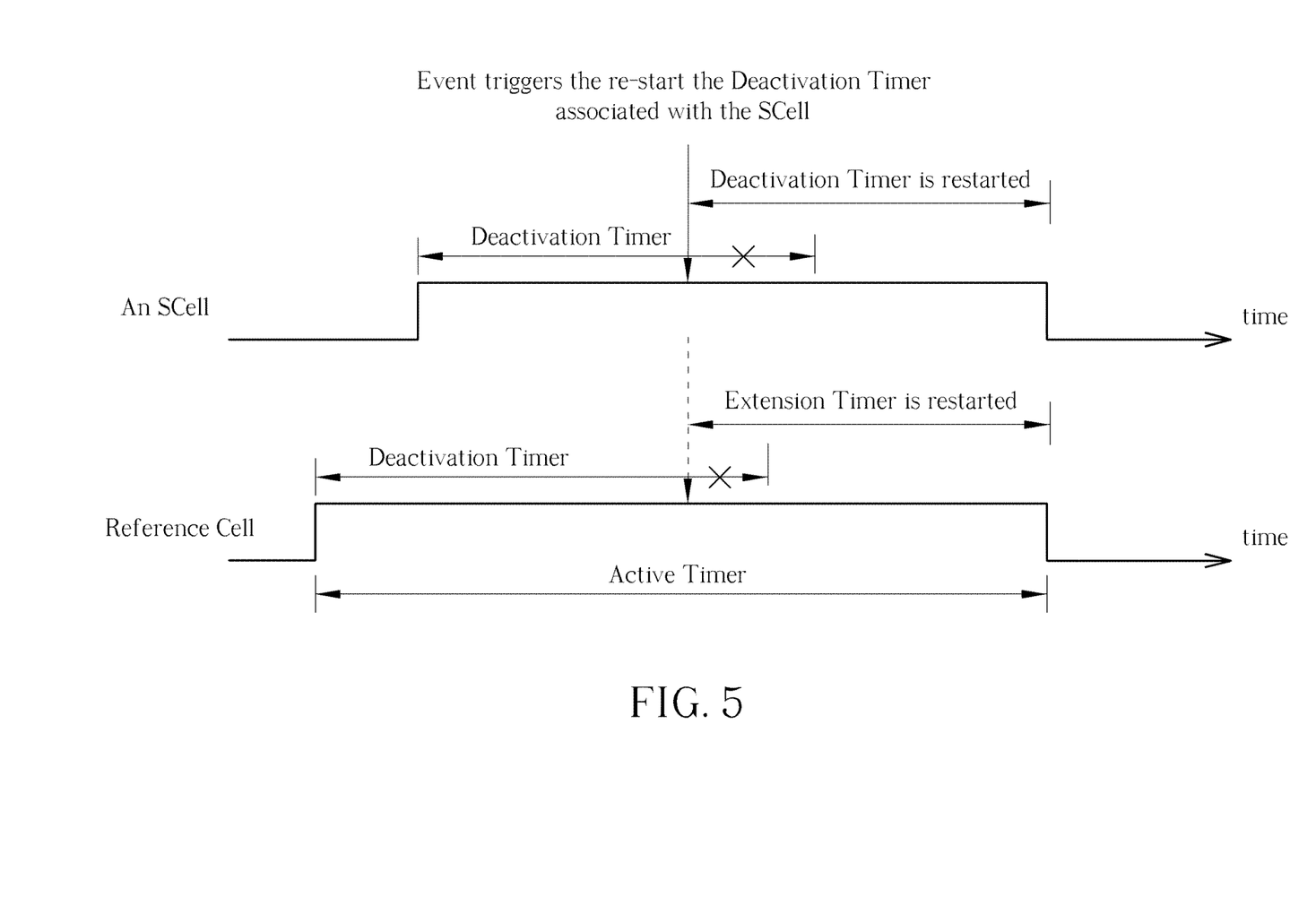

In another embodiment, the UE may start or restart a specific timer (hereafter called an extension timer) for extending the activation time of the reference cell. Note that, the extension timer is defined for providing a period time for SCell activation and may have different length with the deactivation timer. Once the extension timer and the deactivation timer associated with the reference cell expire, the reference cell is deactivated. In FIG. 5, if events trigger the first SCell to start or restart the deactivation timer associated to the first SCell, the UE starts or restarts the deactivation timer associated to the first SCell and starts or restarts the extension timer associated with the reference cell. Note that, the events triggering the start or restart the deactivation timer associated with the first SCell may be referred from above, so it is omitted herein.

Figure 6:
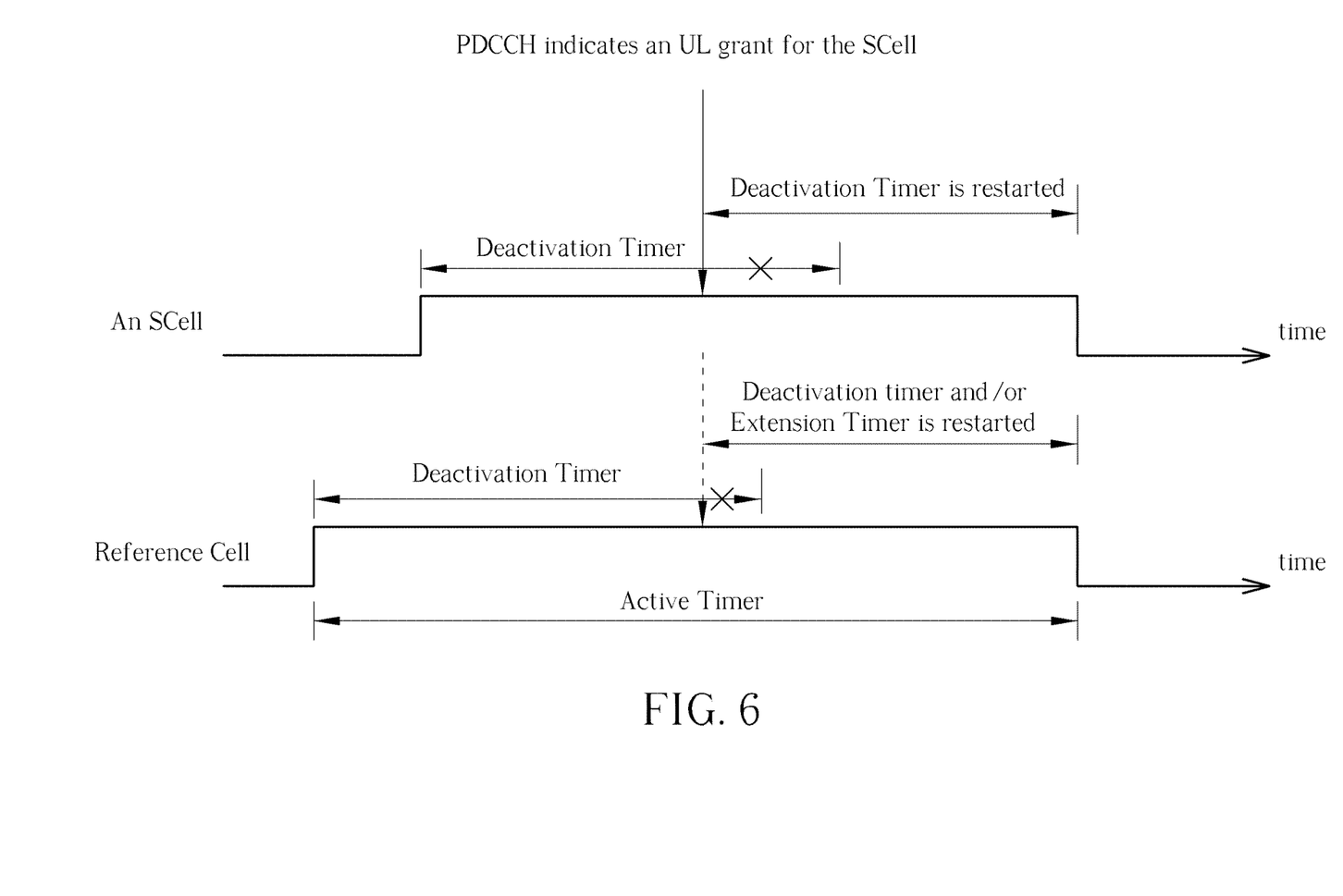
Figure 7:
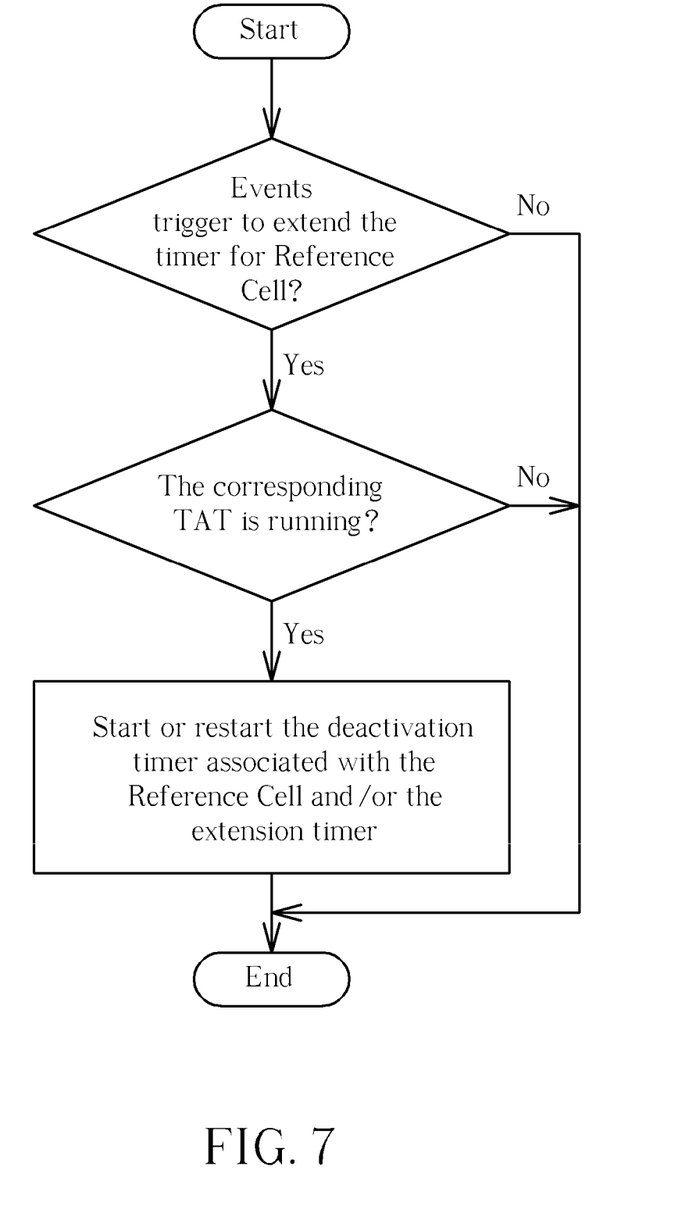

In another embodiment, the UE may start or restart deactivation timer/extension timer for the reference cell when an uplink grant for the first SCell is detected. In FIG. 6, if PDCCH on the first SCell or on a scheduling cell indicates an uplink grant for the first SCell, the UE starts or restarts the deactivation timer/extension timer for the reference cell, so as to extend the activation time of the reference cell.

In another embodiment, the UE further determines whether a time alignment timer (TAT) for the first SCell or for a TA group including the first SCell is running before extending the activation time of the reference cell. In detail, please refer to FIG. 7. The UE determines whether events triggering to extend the timer (i.e. deactivation timer/extension timer) for the reference cell. As illustrated in FIG. 4-6, events triggering to extend the timer for the reference cell may include that a UE receives a Activation/Deactivation command for activating the first SCell, and/or PDCCH on the first SCell indicates an uplink grant or a downlink assignment, and/or PDCCH on a cell scheduling the first SCell indicates an uplink grant or a downlink assignment for the first SCell. If the UE detects any of the abovementioned events, the UE then determines whether the corresponding TAT is running. In addition, the UE starts or restarts the deactivation timer/extension timer for the reference cell when the corresponding TAT is running, so as to extend the activation time of the reference cell.

Figure 8:
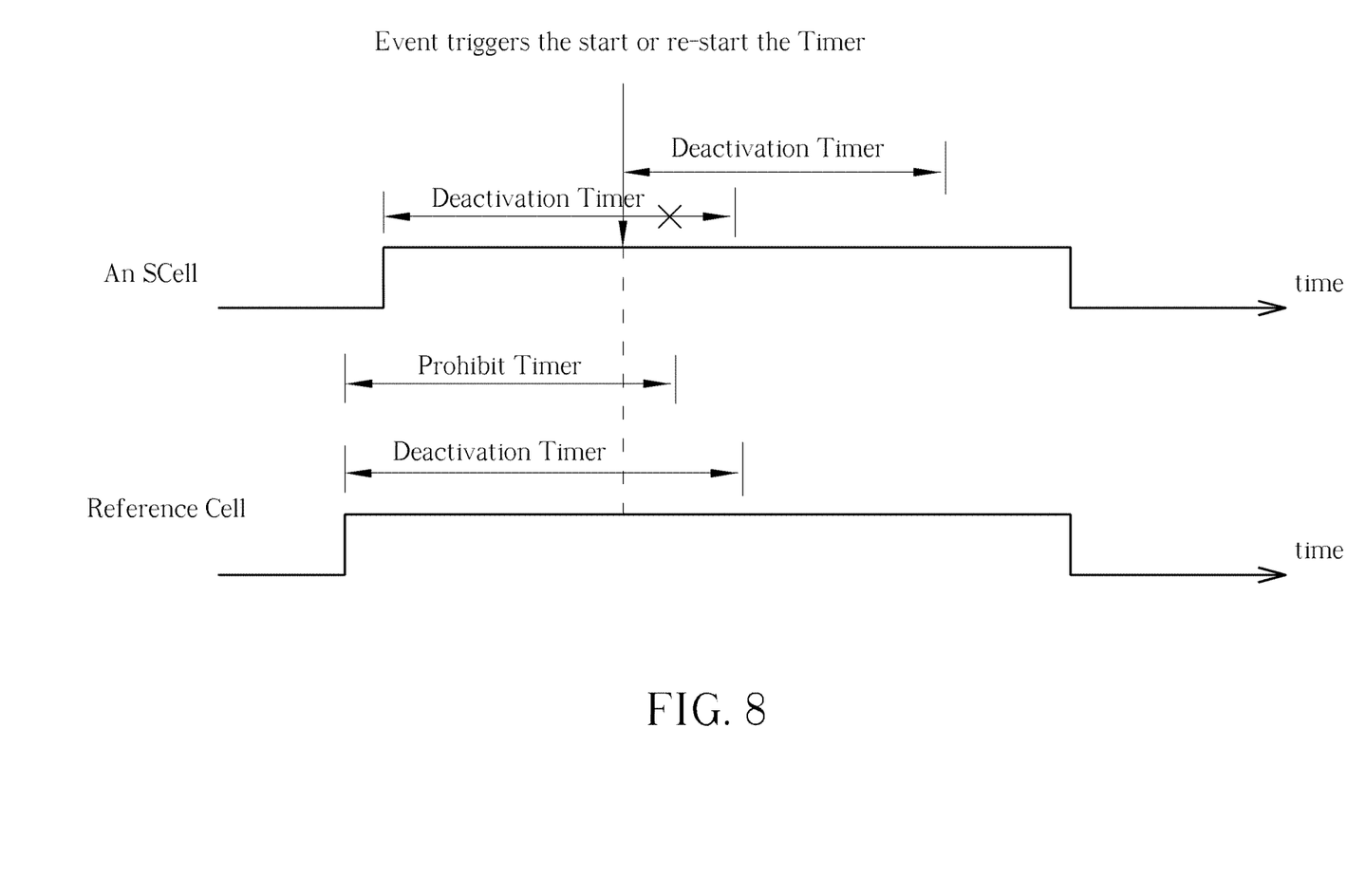
Figure 9:
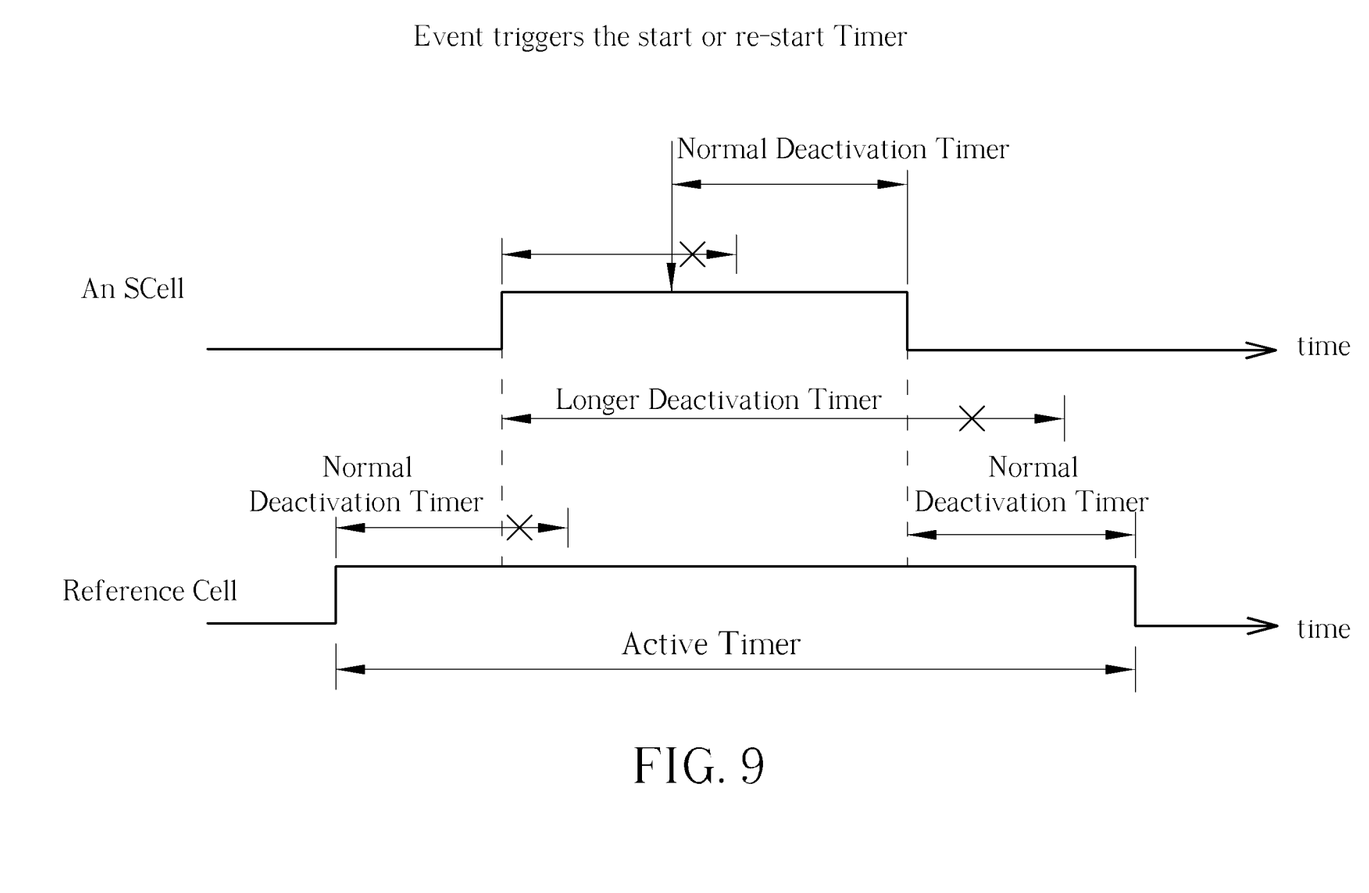

In another embodiment, in order to prevent redundant timer (e.g. deactivation timer or extension timer) start or restart, a prohibit timer is provided. In FIG. 8, when the extension timer/deactivation timer for the reference cell is started or restarted, the UE may also start or restart the prohibit timer. In an example, if the prohibit timer is still running, the UE may not start or restart the deactivation timer/extension timer associated with the reference cell. In another example, if the prohibit timer is still running, the UE may not extend activation time for the reference cell. Note that, the events for triggering start or restart the deactivation timer/extension timer and events for extending the activation time can be referred from above, so it is omitted herein.

In another embodiment, a length of the deactivation timer for the reference cell may have at least two values. One is for normal deactivation timer, and the other is for long deactivation timer. The length of deactivation timer for the reference cell may be change dynamically. For example, in FIG. 9, when the reference Cell is activated, the deactivation timer with normal length may be applied to the reference cell. Once the first SCell which is using the reference cell as information reference is activated, the deactivation timer with longer length may be applied to the reference cell, so as to extend the activation time of the reference cell. Note that, in some embodiments, the long length of the deactivation timer may be set to infinity. Moreover, if the last SCell, which uses the reference cell as information reference is deactivated (or de-configured), the deactivation timer with normal length may be applied to the reference cell. In some embodiments, if the reference cell is activated, and the corresponding TAT (for the TA group) is not running, the deactivation timer with normal length may be applied to the reference cell. On the other hand, if the reference cell is activated, and the corresponding TAT is running, the deactivation timer with longer length may be applied to the reference cell.

In some embodiments, the UE may suspend or stop the running of the deactivation timer for the reference cell. In detail, the deactivation timer associated with the reference cell is suspended (or stopped running) when a SCell, which uses the reference cell as information reference, is activated, so the deactivation timer associated with the reference cell does not expire before the deactivation of the SCell. For example, once a cell which is using the reference cell as information reference is activated, the deactivation timer associated with the reference cell is suspended (or stopped running). In addition, when the last cell which uses the reference cell as information reference is deactivated (or de-configured), the deactivation timer associated with the reference cell would be resumed, or started, or restarted.

Further, the deactivation timer associated with the reference cell is suspended (or stopped running) when the corresponding TAT is running and there is a SCell, which uses the Reference Cell as reference, is activated, so the reference cell can stay in activated state while the corresponding TAT is running. When the TAT expires or the last cell which uses the reference cell as information reference is deactivated (or de-configured)), the deactivation timer associated with the reference cell would be resumed, or started, or restarted.

Note that, if no cell uses the reference cell as information reference, the UE may deactivate the reference cell when an Activation/Deactivation command is received for deactivating the reference cell, or the deactivation timer and the extension timer for the reference cell expire. When the reference cell is deactivated, UE may stop the corresponding timer(s) (e.g. deactivation timer/extension timer) for the reference cell, and/or flush corresponding HARQ buffers for the reference cell, and/or not transmit SRS on the reference cell, and/or not report CQI/PMI/RI/PTI for the reference cell, and/or not transmit on UL-SCH on the reference cell, and/or stop PDCCH and/or PDSCH reception on the reference cell, and/or stop on going Random Access procedure on the reference cell, and/or not transmit PHR for the reference cell, and/or not monitor downlink control signalling (e.g. PDCCH) on corresponding scheduling cell(s).

Figure 10:
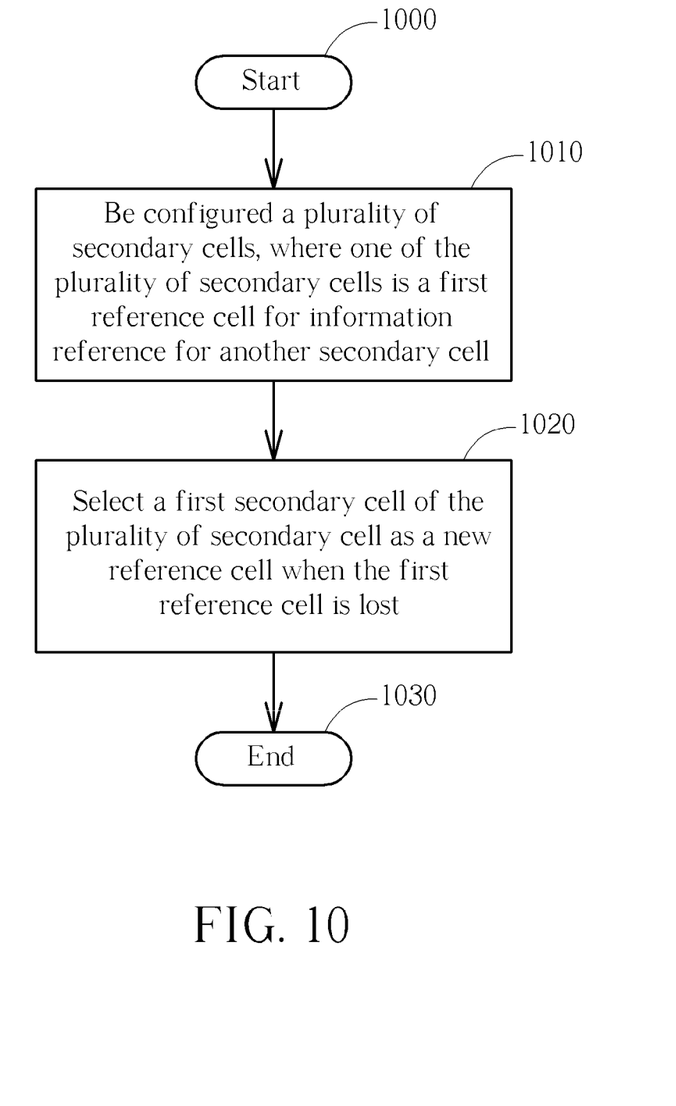
FIG. 10 is a flowchart of an exemplary process.

Please refer to FIG. 10, which illustrates a flowchart of an exemplary process 100. The process 100 is utilized in an UE for reference cell maintenance. The process 100 can be compiled into the program code 214 and includes the following steps:

Step 1000: Start.

Step 1010: Be configured a plurality of secondary cells, where one of the plurality of secondary cells is a first reference cell for information reference for another secondary cell.

Step 1020: Select a first secondary cell of the plurality of secondary cell as a new reference cell when the first reference cell is lost.

Step 1030: End.

According to the process 100, when the reference cell is lost, the UE replaces another cell as the new reference cell. In an embodiment, the reference cell may be lost because it suffers Radio Link Failure (RLF), is deactivated, de-configured and/or is removed. For example, the UE receives a message to de-configure/de-activated the reference cell, or a deactivation timer associated with the reference cell expires.

Note that, in some embodiments, the lost of reference cell may be detected by UE, and the UE may send a message (e.g. a PHY, MAC, RRC message) to inform the network (e.g. an eNB). For example, when the UE detects Radio Link Problem or Radio Link Failure on an SCell, the UE may send a message to inform the network.

In some embodiments, the new reference cell may be determined by the network (e.g. eNB), and the network may send a message (e.g. PDCCH, MAC CE, or RRC message) to inform UE about the selected reference cell. For example, the network may pre-configure one or more back-up reference cell(s) in case the original reference cell is lost. For example, the scheduling cell may be the back-up reference cell. In other embodiments, the network may send a message to de-configure or de-activated the reference cell, and inform UE about the new reference cell in this message. Then, the UE configures the informed cell in this message as the reference cell.

On the other hand, the new reference cell may be determined by the UE, and the UE may send a message to inform the network about the selected reference cell. For example, the UE may send a message to inform the network about the RLF of the reference cell, and inform the network about the new reference cell in the same message. In an embodiment, the UE may autonomously determine a cell from the activated cells in the same group (e.g., TA group) to be the new reference cell. In an embodiment, the UE may select a pre-defined cell (e.g. the PCell or SIB2-Link DL) as new reference cell for the SCell. In an embodiment, the UE may determine the cell with highest priority among the activated cells in the same group to be the new reference cell. For example, the priority of a cell may be assigned/configured to the UE when the cell is added or configured by the network. For example, a cell with a better channel condition (e.g., CQI, PMI, RI, PTI, RSRP, RSRQ, BER, etc.) may have a higher priority. For example, a cell having a smaller cell identity (e.g, cell_index, CellIndex, SCellIndex) may have a higher priority. That is, the cell priority is determined according to the cell identity. In this case, a cell may be configured with a (UE-specific) cell_index, and the PCell may always have the smallest cell_index (e.g., 0). For example, a cell having a lower carrier frequency (or center frequency) may have a higher priority. For example, a cell configured with a longer deactivation timer may have a higher priority. For example, a cell having a wider bandwidth may have a higher priority. For example, a cell which is configured with more DL subframes (or UL subframes in some embodiments) may have a higher priority (e.g. in TDD system). Moreover, the TDD UL-DL configuration index may be used to prioritize these cells. For example, the SIB2-Linked DL may have a highest priority. In this case, if the old Reference Cell is lost, the SIB2-Linked DL would become the new reference cell. In another embodiment, the network may determine the new reference cell based on the above rule, and send a message to inform UE about the determined reference cell.

Further, when the new reference cell is determined, the UE may adjust the reference parameters based on the difference(s) between old reference cell and new reference cell. For example, the UE may adjust the timing of its uplink transmission timing accordingly, or the UE may change the corresponding timing advance value accordingly, or the UE may adjust the timing of its transmissions with a relative accuracy compared to the timing of preceding uplink transmission. For example, the UE may consider the change of DL timing reference as DL path moving. The UE may not change uplink timing immediately but similar to DL path moving, the UE gradually adjust its uplink timing. For example, the UE may change the UL transmission power accordingly, or the UE may adjust the pathloss change parameters (e.g. dl-PathlossChange) accordingly.

Figure 11:
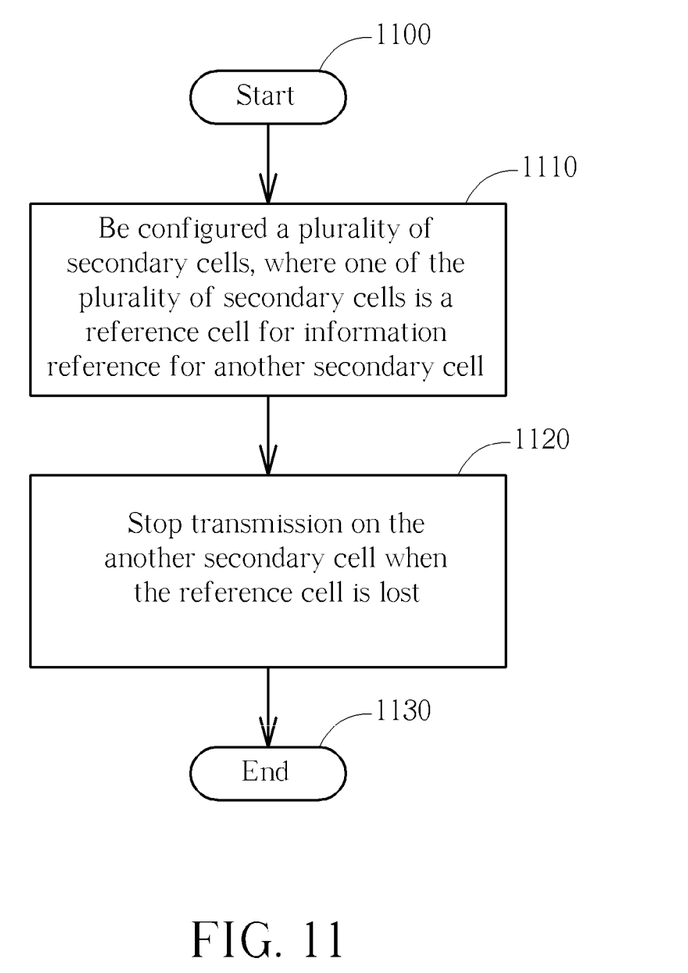
FIG. 11 is a flowchart of exemplary processes.

Please refer to FIG. 11, which illustrates a flowchart of an exemplary process 110. The process 110 is utilized in an UE for reference cell maintenance. The process 110 can be compiled into the program code 214 and includes the following steps:

Step 1100: Start.

Step 1110: Be configured a plurality of secondary cells, where one of the plurality of secondary cells is a reference cell for information reference for another secondary cell.

Step 1120: Stop transmission on the another secondary cell when the reference cell is lost.

Step 1130: End.

According to the process 110, the UE stops (some of) transmission on a SCell, which uses the reference cell as information reference, when the reference cell is lost. In an embodiment, the UE may stop uplink transmission on the SCell when the reference cell is lost. In another embodiment, the UE may stop the corresponding TAT for the TA group or deactivate/de-configure the SCell.

Note that, as abovementioned, the lost of the reference cell may be determined by the network. In this situation, the network may send a message to UE to stop (UL and/or DL) transmission on the SCell(s), which uses the reference cell as information reference. In some embodiments, the lost of reference cell may be detected by the UE. Thus, the UE may optionally send a message to inform the network about the lost of reference cell, and/or UE may stop (UL and/or) data transmission on the corresponding SCell, which uses the reference cell as information reference. For example, the UE may stop some UL transmission on the SCell, not transmit SRS on the SCell, and/or not transmit UL-SCH on the SCell.

In conclusion, the present invention provides methods for reference cell maintenance, so as to avoid inaccurate information reference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reference cell maintenance for a mobile device in a wireless communication system, the method comprising:
being configured a plurality of secondary cells, where one of the plurality of secondary cells is a reference cell for information reference for another secondary cell;
keeping the reference cell in activated when the reference cell is used by the another secondary cell for information reference, wherein keeping the reference cell in activated when the reference cell is used by the another secondary cell for information reference comprises:
starting or restarting a first deactivation timer for the reference cell when the reference cell is used by the another secondary cell for information reference and when a second deactivation timer for the another secondary cell is started or restarted, wherein the first or the second deactivation timer is used for providing a period of time for secondary cell activation, and wherein starting or restarting the second deactivation timer for the another secondary cell comprises:
receiving a physical downlink control channel (PDCCH) indicating an uplink grant or a downlink assignment for the another secondary cell; and
starting or restarting a prohibit timer for the reference cell when the first deactivation timer for the reference cell is started or restarted;
wherein starting or restarting the first deactivation timer for the reference cell when the reference cell is used by another secondary cell for information reference and the second deactivation timer for the another secondary cell is started or restarted comprises:
starting or restarting the first deactivation timer for the reference cell when the reference cell is used by another secondary cell for information reference, the second deactivation timer for the another secondary cell is started or restarted, and the prohibit timer expires.

2. The method of claim 1, wherein keeping the reference cell in activated when the reference cell is used by another secondary cell for information reference comprises:
starting or restarting an extension timer for the reference cell when the reference cell is used by another secondary cell for information reference and a deactivation timer for the another secondary cell is started or restarted, wherein the deactivation timer used for providing a period of time for secondary cell activation, and the extension timer is a specific timer used for providing a period time for reference cell activation.

3. The method of claim 2, wherein starting or restarting the extension timer for the reference cell when the reference cell is used by another secondary cell for information reference and the deactivation timer for the another secondary cell is started or restarted comprises:
starting or restarting the extension timer for the reference cell when the reference cell is used by another secondary cell for information reference, the deactivation timer for the another secondary cell is started or restarted and a time alignment timer (TAT) for the another secondary cell or for a time alignment (TA) group including the another secondary cell is running, wherein the TAT is used for indicating uplink transmission synchronization.

4. The method of claim 3, further comprising:
starting or restarting a prohibit timer for the reference cell when the extension timer for the reference cell is started or restarted;
wherein starting or restarting the extension timer for the reference cell when the reference cell is used by another secondary cell for information reference, the deactivation timer for the another secondary cell is started or restarted, and the TAT is running comprises:
starting or restarting the extension timer for the reference cell when the reference cell is used by another secondary cell for information reference, the deactivation timer for the another secondary cell is started or restarted, the TAT is running, and the prohibit timer expires.

5. The method of claim 2, further comprising:
starting or restarting a prohibit timer for the reference cell when the extension timer for the reference cell is started or restarted;
wherein starting or restarting the extension timer for the reference cell when the reference cell is used by another secondary cell for information reference and the deactivation timer for the another secondary cell is started or restarted comprises:
starting or restarting the extension timer for the reference cell when the reference cell is used by another secondary cell for information reference, the deactivation timer for the another secondary cell is started or restarted, and the prohibit timer expires.

6. The method of claim 1, wherein keeping the reference cell in activated when the reference cell is used by another secondary cell for information reference comprises:
starting or restarting a deactivation timer for the reference cell when the reference cell is used by another secondary cell for information reference and an uplink grant is allocated for the another secondary cell, wherein the deactivation timer is used for providing a period of time for reference cell activation; or
starting or restarting an extension timer for the reference cell when the reference cell is used by another secondary cell for information reference and an uplink grant is allocated for the another secondary cell, wherein the extension timer is a specific timer used for providing a period time for reference cell activation.

7. The method of claim 6, wherein starting or restarting the deactivation timer for the reference cell when the reference cell is used by another secondary cell for information reference and the uplink grant is allocated for the another secondary cell comprises:
starting or restarting the deactivation timer for the reference cell when the reference cell is used by another secondary cell for information reference, the uplink grant is allocated for the another secondary cell and a time alignment timer (TAT) for the another secondary cell or for a time alignment (TA) group including the another secondary cell is running, wherein the TAT is used for indicating uplink transmission synchronization; and
starting or restarting the extension timer for the reference cell when the reference cell is used by another secondary cell for information reference and an uplink grant is allocated for the another secondary cell comprises:
starting or restarting the extension timer for the reference cell when the reference cell is used by another secondary cell for information reference, an uplink grant is allocated for the another secondary cell, and the TAT is running.

8. The method of claim 7, further comprising:
starting or restarting a prohibit timer for the reference cell when the extension timer for the reference cell is started or restarted;

wherein starting or restarting the deactivation timer for the reference cell when the reference cell is used by another secondary cell for information reference, the uplink grant is allocated for the another secondary cell, and the TAT is running comprises:
  starting or restarting the deactivation timer for the reference cell when the reference cell is used by another secondary cell for information reference, the uplink grant is allocated for the another secondary cell, the TAT is running, and the prohibit timer expires; and
wherein starting or restarting the extension timer for the reference cell when the reference cell is used by another secondary cell for information reference, the uplink grant is allocated for the another secondary cell, and the TAT is running comprises:
  starting or restarting the extension timer for the reference cell when the reference cell is used by another secondary cell for information reference, the uplink grant is allocated for the another secondary cell, the TAT is running, and the prohibit timer expires.

9. The method of claim 6, further comprising:
starting or restarting a prohibit timer for the reference cell when the extension timer for the reference cell is started or restarted;
wherein starting or restarting the deactivation timer for the reference cell when the reference cell is used by another secondary cell for information reference and the uplink grant is allocated for the another secondary cell comprises:
  starting or restarting a deactivation timer for the reference cell when the reference cell is used by another secondary cell for information reference, the uplink grant is allocated for the another secondary cell, and the prohibit timer expires; or
  starting or restarting the extension timer for the reference cell when the reference cell is used by another secondary cell for information reference, the uplink grant is allocated for the another secondary cell, and the prohibit timer expires.

10. The method of claim 1, wherein starting or restarting the first deactivation timer for the reference cell when the reference cell is used by another secondary cell for information reference and the second deactivation timer for the another secondary cell is started or restarted comprises:
  starting or restarting the first deactivation timer for the reference cell when the reference cell is used by another secondary cell for information reference, the second deactivation timer for the another secondary cell is started or restarted, and a time alignment timer (TAT) for the another secondary cell or for a time alignment (TA) group including the another secondary cell is running, wherein the TAT is used for indicating uplink transmission synchronization.

11. The method of claim 10, further comprising:
starting or restarting a prohibit timer for the reference cell when the first deactivation timer for the reference cell is started or restarted;
wherein starting or restarting the first deactivation timer for the reference cell when the reference cell is used by another secondary cell for information reference, the second deactivation timer for the another secondary cell is started or restarted, and the TAT is running comprises:
  starting or restarting the first deactivation timer for the reference cell when the reference cell is used by another secondary cell for information reference, the second deactivation timer for the another secondary cell is started or restarted, the TAT is running, and the prohibit timer expires.

12. The method of claim 1, wherein keeping the reference cell in activated when the reference cell is used by another secondary cell for information reference comprises:
  using a deactivation timer for the reference cell with a long activation length compared to a normal activation length when the reference cell is used by another secondary cell for information reference and the another secondary cell is activated, wherein the deactivation timer is used for providing a period of time for secondary cell activation.

13. The method of claim 12, wherein configuring the deactivation timer for the reference cell with a long activation length compared to a normal activation length when the reference cell is used by another secondary cell for information reference comprises:
  using the deactivation timer for the reference cell with a long activation length compared to a normal activation length when the reference cell is used by another secondary cell for information reference, the another secondary cell is activated, and a time alignment timer (TAT) for the another secondary cell or for a time alignment (TA) group including the another secondary cell is running, wherein the TAT is used for indicating uplink transmission synchronization.

14. The method of claim 1, wherein keeping the reference cell in activated when the reference cell is used by the another secondary cell for information reference comprises:
  suspending or stopping a deactivation timer for the reference cell when the reference cell is used by the another secondary cell for information reference, and the another secondary cell is activated, wherein the deactivation timer is for providing a period of time for reference cell activation.

15. The method of claim 14, wherein suspending or stopping the deactivation timer for the reference cell when the reference cell is used by the another secondary cell for information reference, and the another secondary cell is activated comprise:
  suspending or stopping the deactivation timer for the reference cell when the reference cell is used by the another secondary cell for information reference, the another secondary cell is activated, and a time alignment timer (TAT) for the another secondary or for a time alignment (TA) group including the another secondary cell is running, wherein the TAT is used for indicating uplink transmission synchronization.

16. The method of claim 1, wherein the reference cell is a timing reference cell or a pathloss reference cell.

* * * * *